United States Patent [19]

Tanaka et al.

[11] Patent Number: 4,790,520
[45] Date of Patent: Dec. 13, 1988

[54] VIBRATION INSULATING DEVICE WITH FLEXIBLE DIAPHRAGM BETWEEN RADIALLY OUTER GAS CHAMBER AND RADIALLY INNER LIQUID CHAMBER

[75] Inventors: Atsuo Tanaka, Zama; Takao Okubo, Atsugi; Takao Ushijima, Chigasaki; Takeshi Noguchi, Yokohama, all of Japan

[73] Assignees: Nissan Motor Co., Ltd.; Bridgestone Corporation, both of Japan

[21] Appl. No.: 933,898

[22] Filed: Nov. 24, 1986

[30] Foreign Application Priority Data

Nov. 25, 1985 [JP] Japan .................. 60-262393

[51] Int. Cl.⁴ .................. F16M 1/00; F16F 7/00; F16F 9/10
[52] U.S. Cl. .................. 267/140.1; 188/298; 248/562; 248/636; 267/35; 267/122; 267/140.5; 267/141.2; 267/141.3; 267/141.6; 267/152; 267/219; 267/292; 280/716; 384/222
[58] Field of Search .................. 267/219-220, 267/195, 257, 259, 258, 35, 279-282, 292-294, 151-154, 150, 121, 140.1-141.7, 122, 64.27, 64.23, 64.24; 188/378, 298, 322.5; 248/562, 621, 565, 631, 636, 638, 608-609, 603-604; 280/708-712, 716, 717, 697; 384/222; 403/225, 228; 180/300, 312; 16/2

[56] References Cited

U.S. PATENT DOCUMENTS 4,342,446  8/1982  Eaton et al. .................. 267/35
4,588,174  5/1986  Konishi .................. 267/141.2 X
4,605,207  8/1986  Konishi .................. 267/281
4,630,806  12/1986  Dan et al. .................. 267/140.1
4,690,389  9/1987  West .................. 267/292 X
4,693,456  9/1987  Kanda .................. 267/140.1

FOREIGN PATENT DOCUMENTS 48-036151  11/1973  Japan .
0139507  7/1985  Japan .................. 248/562
0172743  9/1985  Japan .................. 267/140.1

Primary Examiner—Douglas C. Butler
Attorney, Agent, or Firm—Leydig, Voit & Mayer

[57] ABSTRACT

A vibration insulating device to be installed between two members of a vibration system of an automotive vehicle. The device consists of an annular elastic member disposed between coaxial inner and outer cylindrical members and located coaxial with the outer cylindrical member. The elastic member is formed at its outer peripheral surface with a deep annular groove coaxial with the outer cylindrical member which groove is covered with the outer cylindrical member to define an annular hollow chamber. A generally cylindrical flexible diaphragm member is secured between the outer cylindrical member and the elastic member in such a manner that its central annular section divides the hollow chamber into a radially outward gas chamber and a radially inward liquid chamber, thereby effectively absorbing even high frequency small amplitude vibration transmitted to the device under deformation of the flexible diaphragm member.

24 Claims, 3 Drawing Sheets

VIBRATION INSULATING DEVICE WITH FLEXIBLE DIAPHRAGM BETWEEN RADIALLY OUTER GAS CHAMBER AND RADIALLY INNER LIQUID CHAMBER

BACKGROUND OF THE INVENTION

1. Field of the Invention

The present invention relates to a vibration insulating device to be used as an elastic bushing, an engine mount, a center supporting device for a drive shaft (for example, of two-piece type) or the like, and more particularly to an improvement in such a vibration insulating device to effectively insulate even high frequency vibration.

2. Description of the Prior Art

In connection with vibration insulating devices for insulating vibration to be transmistted from one member to another member of a vibration system, a device of the fluid-filled type has been proposed as disclosed in Japanese Patent (First) Publication No. 48-36151, which is configured as follows: An outer cylindrical member is coaxially disposed around an inner cylindrical member. An elastic member made of rubber or other elastomeric material is interposed between the outer and inner cylindrical members to interconnect them. The elastic member is formed at its axial central section with two fluid chambers which are located opposite to one another in the diametrical direction with respect to the inner cylindrical member. The two fluid chambers are communicated with one another through an orifice passage formed in the elastic member. The two fluid chambers are filled with a fluid having a predetermined viscosity.

With such a vibration insulating device, when relatively low frequency vibration is transmitted to the outer or inner cylindrical member, one of the two fluid chambers deforms in a direction to contract while the other fluid chamber deforms in a direction to expand, so that the fluid in the former fluid chamber flows through the orifice passage to the latter fluid chamber. This provides effective vibration insulation or damping due to flow resistance of the fluid flowing through the orifice passage and due to viscosity resistance of the fluid itself.

However, in the event that vibration of high frequency (higher than a predetermined level, for example, 50 Hz) is transmitted to one of the outer and inner cylindrical members, the fluid is unavoidably prevented from flowing through the orifice passage so that the orifice passage is put into a block condition, thereby considerably raising the dynamic spring constant of the vibration insulating device upon receiving the high frequency vibration.

SUMMARY OF THE INVENTION

A vibration insulating device of the present invention includes an annular elastic member disposed between an inner cylindrical member and an outer cylindrical member to interconnect them. An annular hollow chamber is formed between the elastic member and the outer cylindrical member and located coaxial with the outer cylindrical member. Additionally, an annular flexible diaphragm member is provided in such a manner that at least a part thereof is disposed within the hollow chamber to define a gas chamber filled with gas, and a liquid chamber filled with a liquid. The annular flexible diaphragm member is located generally coaxial with the outer cylindrical member, so that each of the gas and liquid chambers extends throughout the whole periphery of the elastic member.

Accordingly, low frequency large amplitude vibration transmitted to the vibration insulating device is sufficiently damped under the flowing movement of the fluid in the fluid chamber. Furthermore, high frequency small amplitude vibration can be effectively absorbed under the deformation of the flexible diaphragm member, thereby preventing the dynamic spring constant of the device from increasing due to high frequency vibration. This effectively prevents so-called dynamic static ratio (dynamic spring constant/static spring constant) of the device from increasing.

BRIEF DESCRIPTION OF THE DRAWINGS

In the attached drawings, like reference numerals designate corresponding elements and parts, in which.

DETAILED DESCRIPTION OF THE INVENTION

Figure 1A:
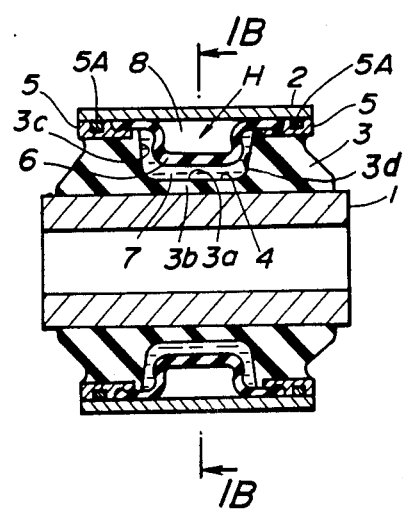
FIG. 1A is a longitudinal cross-sectional view of a first embodiment of a vibration insulating device in accordance with the present invention.
Figure 1B:
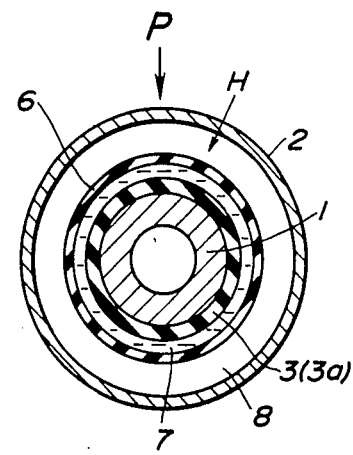
FIG. 1B is a cross-sectional view taken in the direction of arrows substantially along the line 1B—1B of FIG. 1A.

Referring now to FIGS. 1A and 1B, a first embodiment of a vibration insulating device according to the present invention is illustrated. The vibration insulating device is of the bushing type and designed to be used in a suspension system or vibraton system of an automotive vehicle. The vibration insulating device comprises an inner cylindrical member 1 connected to one member (not shown) of the vibration system, and an outer cylindrical member 2 connected to another member (not shown) of the vibration system. The inner and outer cylindrical members 1, 2 are made of a rigid material such as metal. The outer cylindrical member 2 is coaxially disposed around the inner cylindrical member 1 in such a manner as to be spaced from one another. A generally cyliindrical annular elastic member 3 made of an elastomeric material such a rubber is interposed between the inner and outer cylindrical members 1, 2 so as to interconnect each other. The annular elastic 3 is formed at an axially central part with an annular groove 4 which is located coaxial with the inner peripheral surface thereof. The annular groove 4 is open to the outside of the elastic member 3 and has an annular elongated bottom surface 3a which is located spaced from and generally parallel to the inner peripheral surface of the annular elastic member 3 so that an annular diaphragm-like section 3b remains between the bottom surface 3a and the annular elastic member inner peripheral surface. Accordingly, the annular groove 4 has the bottom surface 3a and oppositely located side wall surfaces 3c, 3d each of which is annular and generally perpendicular to the bottom surface 3a.

The inner peripheral surface of the elastic member 3 is bonded to the outer peripheral surface of the inner cylindrical member 1, for example, by adhesion due to vulcanization. In this case, the elastic member 3 has an axial length similar to that of the inner cylindrical member 1. The outer peripheral surface of the elastic member 3 includes two annular outer peripheral surfaces which are separate from one another and located on the opposite sides of the annular groove 4. The two annular peripheral surfaces of the elastic member 3 are bonded respectively to two rigid rings 5, 5 at their inner peripheral surface, for example, by adhesion due to valcanization. The outer cylindrical member 2 is securely fitted on the rings 5, 5, for example, by means of caulking or pressing the outer cylindrical member 2 onto the rings 5, 5. In this embodiment, the outer cylindrical member 2 has an axial length similar to that of the elastic member 3. As shown, a O-ring 5A is interposed between each ring 5 and the outer cylindrical member 2 to maintain fluid-tight seal therebetween, so that the annular goove 4 formed in the elastic member 3 is sealingly covered with the outer cylindrical member 2 thereby to form an annular hollow chamber H.

An annular flexible diaphragm member 6 is disposed in the hollow chamber H in such a manner as to divide the hollow chamber H into a liquid chamber 7 and a gas chamber 8. The diaphragm member 6 is made of an elastomeric material such as rubber and has opposite annular end sections in its axial direction, each of the end sections being inserted between the ring 5 and the outer cylindrical member 2 to be secured in position. The diaphgram member 6 has an annular central section which is located in the hollow chamber H and has a C-shaped cross-section so that the fluid chamber 7 having a generally C-shaped cross-section is defined between the wall surface of the elastic member annular groove 4 and the diaphragm member 6 whereas the gas chamber having a generally rectangular cross-section is defined between the outer cylindrical member 2 and the diaphragm member 6. The liquid and gas chambers 7, 8 extend annularly throughout the whole periphery of the annular groove 4. In other words, the liquid and gas chambers 7, 8 are anular and located generally coaxial with the inner peripheral surface of the annular elastic member 3 and accordingly with the inner cylindrical member 1. The liquid chamber 7 is filled with, for example, a fluid having a kinematic viscosity ranging from 1000 to 100000 cSt. The gas chamber 8 is filled with a gas such as air. Otherwise, the gas chamber 8 may be communicated with ambient air through a through-hole (not shown) formed in the outer cylindrical member 2.

Separation of the liquid and gas chambers 7, 8 and filling the liquid and gas into them are, for example, carried out as follows: First the diaphragm member 6 is temporarily fixed to both the rings 5, 5 in the liquid before the outer cylindrical member 2 is secured onto the rings 5, 5, in which the liquid chamber 7 is confined and filled with the liquid. Thereafter, the outer cylindrical member 2 is caulked or pressed onto the rings in the gas so as to be secured onto the rings 5, 5, in which the gas chamber 8 is confined and filled with the gas.

The manner of operation of the thus configurated vibratioon insulating device will be discussed hereinafter.

When relatively low frequency large amplitude vibration is transmitted to the vibration insulating device so that an external force as indicated by an arrow P is applied to the outer cylindrical member 2, the fluid located at an upward section (in the drawing) of the fluid chamber 7 is allowed to flow to a lower section (in the drawing) of the liquid chamber 7 under a slight deformation of the diaphragm member 6, so that a descending displacement of the outer cylindrical member 2 relative to the inner cylindrical member 1 is made.

During this process, kinetic energy is given to the liquid in the liquid chamber 7 under the effect of the vibration transmitted to the outer cylindrical member 2. A major part of the kinetic energy of the liquid is converted to heat energy owing to friction between portions of the liquid and to friction of the liquid to the wall surface of the fluid chamber 7 during flowing of the liquid in the annular liquid chamber 7. Consequently, the vibration transmitted to the outer cylindrical member 2 is sufficiently effectively damped or insulated thereby to prevent the vibration from being transmitted to the inner cylindrical member 1. The operation is similar where the outer cylindrical member 2 upwardly displaces relative to the inner cylindrical member 1 and also where the outer cylindrical member displaces relative to the inner cylindrical member in other directions than mentioned above.

In general, such vibration damping effect of a vibration insulating device comes to its maximum value when the frequency of the vibration transmitted to the device reaches a predetermined level. However, in the event that the vibration frequency rises over a predetermined high level (for example, 50 Hz), the flowing movement of a liquid in a liquid chamber becomes impossible owing to the viscosity, inertia force, friction and the like of the fluid, so that the internal pressure within the fluid chamber comes to a high level alternatively at locations which are opposite to each other in the diametrical direction.

However, with the vibration insulating device of FIGS. 1A and 1B, against a tendency that the internal pressure in the fluid chamber rises as discussed above, the diaphragm member 6 elastically deforms in the direction to expand the fluid chamber. Consequently, the fluid chamber internal pressure is prevented from rising, and is held within the allowable range of deformation of the diaphragm member 6.

Now, in case where the vibration insulating device of FIGS. 1A and 1B is installed, for example, to a vehicle body of the automotive vehicle in which the amplitude of high frequency vibration transmitted to the vibration insulating device is generally less than ±0.5 mm, the deformation allowable range of the diaphragm member 6 is preferably ±0.5 mm, so that the high frequency small amplitude vibration can be sufficiently absorbed under the deformation of the diaphragm member 6. As a result, the fluid chamber internal pressure is prevented from rising, thereby suppressing rise of the dynamic spring constant of the vibration insulating device.

In this connection, where the deformation allowable range of the diaphragm member 6 is set too wide, the diaphragm member 6 deforms similarly to that discussed above even against transmission of low frequency vibration to the vibration insulating device, thereby unavoidably reducing the flowing amount of the fluid. As a result, the vibration insulating device cannot sufficiently exhibit vibration damping effect. Accordingly, it is preferably that cords or canvas are embedded in the diaphragm member 6 thereby to suppress the diaphragm member deformation allowable amount at a necessary minimum value.

Further embodiments arranged to suppress the deformation amount of the diaphragm member at a necessary minimum value will be discussed hereinafter with reference to FIGS. 2 and 3.

Figure 2:
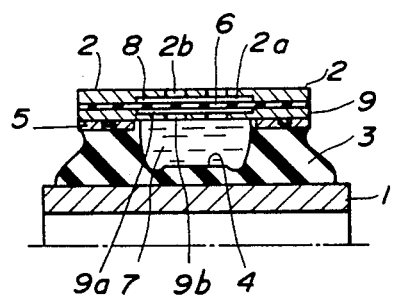
FIG. 2 is an upper half of a longitudinal cross-sectional view of a second embodiment of the vibration insulating device in accordance with the present invention.

FIG. 2 illustrates a second embodiment of the vibration insulating device according to the present invention, which is similar to the first embodiment of FIGS. 1A and 1B. In this embodiment, a perforated intermediate tube or cylindrical member 9 is disposed coaxial with and secured onto the rings 5, 5 upon being caulked or pressed, in which the intermediate tube functions to restrict deformation of the diaphragm member 6. Additionally, the diaphragm member 6 is securely interposed between the intermediate tube 9 and the outer cylindrical member 2 which is secured through the diaphragm member onto the intermediate tube 9 upon being caulked or pressed, in which the outer cylindrical member also functions to restrict deformation of the diaphragm member 6. As shown, the intermediate tube 9 is formed at its outer peripheral surface with a shallow annular groove 9a which is located at its section corresponding to the annular groove 4 and faces to the diaphragm member 6. The shallow annular groove 9a is coaxial with the inner peripheral surface of the intermediate tube 9 and defines there inside a part of the liquid chamber 7. Additionally, the outer cylindrical member 2 is formed at its inner peripheral surfaace with a shallow annular groove 2a which is located corresponding to the intermediate tube shallow annular groove 9a and faces to the diaphragm member 6. The shallow annular groove 2a is coaxial with the outer peripheral surface of the outer cylindrical member 2 and defines thereinside the gas chamber 8 to be filled with the gas (air). Accordingly, the two shallow annular grooves 9a, 2a are located on the opposite sides of the diaphragm member 6 so that the diaphragm member 6 at a section corresponding to the groove 9a, 2a, is separate and spaced from the surface of the intermediate tube 9 and the outer cylindrical member 2.

With this configuration, the diaphragm member 6 is surely prevented from a radially outward deformation in an amount over a predetermined level upon coming into contact with the outer cylindrical member 2 while surely prevented from radially inward deformation in an amount over a predetermined level upon coming into contact with the intermediate tube 9, so that the vibration insulating device can exhibit a sufficient vibration damping effect against relative low frequency vibration.

In this embodiment, the outer cylindrical member 2 is formed with through-holes 2b through which the gas chamber 8 defined in the shallow annular groove 2a communicates with ambient air, thereby preventing the gas chamber internal pressure from increasing while facilitating deformation of the diaphgram member 6. Additionally, the intermediate tube 9 is formed with through-holes 9b which function to restrict fluid flow between the fluid chamber sections on opposite sides of the intermediate tube 9. Consequently, during transmission of vibration to the vibration insulating device, the kinetic energy of the liquid passing through the through-holes 9a is converted to heat energy, so that through-holes 9a contributes to vibration damping or insulation.

Figure 3:
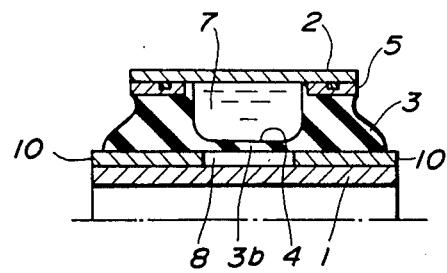
FIG. 3 is an upper half of a cross-sectional view similar to FIG. 2 but showing a third embodiment of the vibration insulating device in accordance with the present invention.

FIG. 3 illustrates a third embodiment of the vibration insulating device according to the present invention, which is similar to the first embodiment of FIGS. 1A and 1B. In this embodiment, two intermediate tubes or cylindrical members 10, 10 are secured onto the innter cylindrical member 1 and disposed coaxial with the inner cylindrical member 1. The intermediate tubes 10, 10 are separate from each other. The elastic member 3 is securely mounted on the intermediate tubes 10, 10 in such a manner that the inner peripheral surface of the elastic member 3 is in contact with the outer peripheral surface of each intermediate tube 10. Accordingly, an annular space serving as the gas chamber 8 is located inside the annular diaphgram-like section 3b of the elastic member 3 and defined by the outer peripheral surface of the inner cylindrical member 1, the inner peripheral surface of the elastic member diaphgram section 3b, and the oppositely disposed inner end edges of the intermediate tubes 10, 10. The gas chamber 8 is filled with a gas. In this embodiment, the hollow chamber defined inside the annular groove 4 is filled with the fluid and serves as the liquid chamber 7, so that no diaphgram member is disposed inside the annular groove 4. It will be understood that the diaphgram-like section 3b of the elastic member 3 serves as an annular diaphragm member separating the liquid chamber 7 and the gas chamber 8 in this embodiment.

With this configuration, against a tendency that the internal pressure of the liquid chamber 7 rises, the elastic member diaphragm-like section 3b can deform only until it comes into contact with the inner cylindrical member 1 serving as a member for restricting deformation of the diaphgram-like section 3b. Accordingly, the maximum deformation amount of the elastic member diaphragm-like section 3b can be set at a desired value, thereby offering advantage that relatively high frequency small amplitude vibration is effectively absorbed while sufficiently damping relatively low frequency large amplitude vibration.

Figure 4:
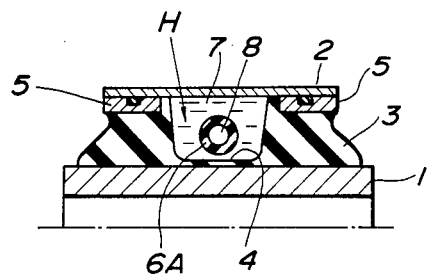
FIG. 4 is an upper half of a cross-sectional view similar to FIG. 2 but showing a fourth embodiment of the vibration insulating device in accordance with the present invention.

FIG. 4 is a fourth embodiment of the vibration insulating device according to the present invention, which is similar to the first embodiment of FIGS. 1A and 1B with the exception that an annular hollow hose-shaped diaphragm member made of elastic or elastomeric material is disposed within the hollow chamber H in place of the diaphragm member 6 of the first embodiment. In this embodiment, the hose-shaped diaphragm member 6A is disposed generally coaxial with the elastic member 3, so that the air chamber 8 is defined inside the hose-shaped diaphragm member 6A whereas the liquid chamber 7 is defined outside the hose-shaped diaphragm member 6A. It will be understood that the same vibration damping effect as in the above-discussed embodiments can be obtained in this embodiment.

Figure 5A:
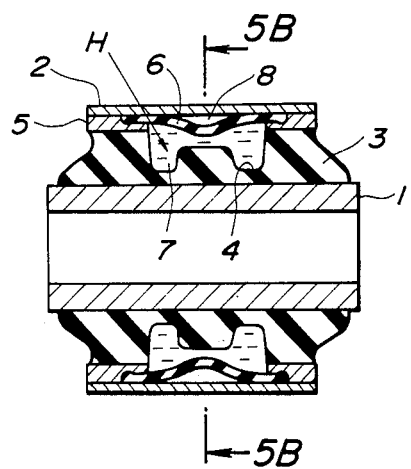
FIG. 5A is a longitudinal cross-sectional view similar to FIG. 1 but showing a fifth embodiment of the vibration insulating device in accordance with the present invention.
Figure 5B:
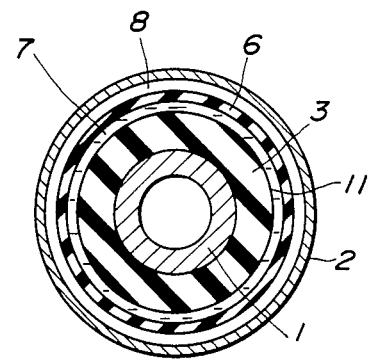
FIG. 5B is a cross-sectional view taken in the direction substantially along the line 5B—5B of FIG. 5A.

FIGS. 5A and 5B illustrate a fifth embodiment of the vibration insulating device according to the present invention, which is similar to the first embodiment of FIGS. 1A and 1B with the exception that the elastic member 3 is formed at the annular diaphragm-like section 3b with an annular stop member 11 to prevent excessive relative displacement between the inner and outer cylindical mbmers 1, 2. In this embodiment, the annular stop member 11 is located at the axial central section of the hollow chamber H and projects radially outwardly from the elastic member diaphragm-like section 3b. The stop member 11 is intergral with the elastic member 3 and accordingly made of the same material as in the elastic member 3. The outer peripheral surface of the stop member 11 is considerably separate from the outer cylindrical member 2 so that the diaphragm member 6 is disposed between the outer peripheral surface of the stop member 11 and the inner peripheral surface of the outer cylindrical member 2. The diaphragm member 6 divides the hollow chamber H into the liquid chamber 4 and the gas chamber 8.

With this configuration, when a large external force is transmitted to the vibration insulating device, the annular stop member 11 strikes against the outer cylindrical member 2 with damping action, thereby effectively preventing excessive radial relative displacement between the inner and outer cylindrical movement 1, 2. Furthermore, the stop member 11 increases contacting surface of the liquid with the wall surface of the liquid chamber and accordingly sufficiently increases flow resistance of the liquid.

It will be understood that the stop member 11 may be of the shape having a plurality of projections which project from the elastic member diaphragm-like section 3b and are located spaced from each other in the peripheral direction, in which the thus formed stop member further increases flow resistance of the liquid while causing the flowing liquid to make energy loss owing to abrupt increase and decrease in cross-sectional area of liquid flow passage defined through a space between the adjacent projections of the stop member, thus further effectively damping vibration transmitted to the vibration insulating device.

Figure 6A:
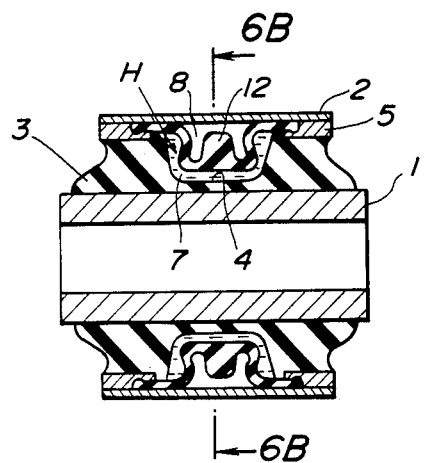
FIG. 6A is a longitudinal cross-sectional view similar to FIG. 1 but showing a sixth embodiment of the vibration insulating device in accordance with the present invention.
Figure 6B:
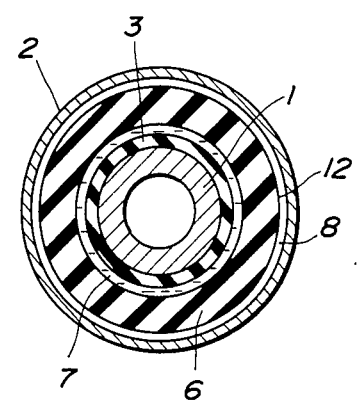
FIG. 6B is a cross-sectional view taken in the direction of arrows substantially along the line 6B—6B of FIG. 6A.

FIGS. 6A and 6B illustrate a sixth embodiment of the vibration insulating device according to the present invention, which is similar to the first embodiment of FIGS. 1A and 1B except for provision of an annular stop member 12 in the gas chamber 12 so as to prevent excessive relative displacement between the inner and outer cylindrical members 1, 2. In this embodiment, the stop member 12 is formed integral with the diaphragm member 6 and located in the gas chamber 8. The annular stop member 12 projects radially outwardly from the diaphragm member 6 toward the outer cylindrical member 2 in such a manner that the outer periphery of the stop member 12 is normally separate from the inner surface of the outer cylindrical member 2. The stop member 12 is disposed generally coaxial with the diaphragm member 6. It will be appreciated that the stop member 12 prevents excessive radial relative displacement between the inner and outer cylindrical members 1, 2 while preventing excessive deformation of the diaphragm member 6.

Figure 7:
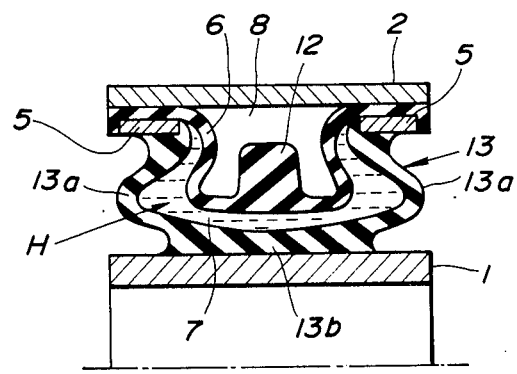
FIG. 7 is a upper half of a longitudinal cross-sectional view of a seventh embodiment of the vibration insulating device in accordance with the present invention.

FIG. 7 illustrates a seventh embodiment of the vibration insulating device according to the present invention, which is similar to the sixth embodiment of FIGS. 6A and 6B with the exception that an elastic diaphragm member 13 is used in place of the cylindrical elastic member 3 of the sixth embodiment. In this embodiment, the elastic diaphragm member 14 includes oppositely located annular side wall sections 13a, 13a, and a annular bottom wall section 13b integrally connecting the side wall sections 13a, 13a at their inner peripheral portion. Each side wall section 13 is secured at its outer peripheral portion to the intermediate ring 5 on which the outer cylindrical member 2 is secured through the diaphragm member 6. The bottom wall section 13b is secured to the outer peripheral surface of the inner cylindrical member 1. Thus, the hollow chamber H is defined between the inner wall surface of the elastic diaphragm member 13 and the inner peripheral surface of the outer cylindrical member 2, in which the diaphragm member 6 as in the sixth embodiment is disposed to divide the hollow chamber H into the liquid chamber 7 and the gas chamber 8.

This embodiment vibration insulating device is, for example, used as a center supporting device for a two-piece driveshaft of an automotive vehicle or as other devices for supporting a relatively light weight vibratory member, thereby effectively damping or insulating vibration thereof.

While the diaphragm member 13 has been shown and described as connecting the inner and outer cylindrical member 1, 2 only in the seventh embodiment of FIG. 7, it will be understood that the diaphragm member 13 may be used in place of the elastic member 3 in other embodiments shown in FIGS. 1A to 6B.

Although the gas chamber 8 of all the embodiments has been shown and described as being filled with only gas, it will be understood that foam material having open cell may be enclosed in the gas chamber 8. While the stop member 11, 12 has been shown and described as projecting radially outwardly from the elastic member 3 or the diaphragm member 6, it will be understood that the stop member 11, 12 may project radially inwardly from the outer cylindrical member 2 or the diaphragm member 6.

While the liquid filled in the liquid chamber 7 has been described as having a relatively high kinematic viscosity, it will be appreciated that the liquid may be one having a relatively low kinematic viscosity such as ethylene glycol having a kinematic viscosity of 30 cSt.

What is claimed is:

1. A vibration insulating device comprising:
   an inner cylindrical member;
   an outer cylindrical member disposed generally coaxially around said inner cylindrical member;
   an annular elastic member disposed between said inner and outer cylindrical members and securely connected to said inner and outer cylindrical members, respectively, said annular elastic member being generally coaxial with said inner cylindrical member;
   means defining an annular hollow chamber between said inner and outer cylindrical members, said annular hollow chamber being generally coaxial with said inner cylindrical member, at least a part of said annular hollow chamber being defined by said annular elastic member;
   an annular flexible diaphragm member at least a part of which is disposed within said hollow chamber to define, within said hollow chamber, an annular liquid chamber filled with a liquid and an annular gas chamber filled with a gas, said flexible diaphragm member, said liquid chamber, and said gas chamber being generally coaxial with said outer cylindrical member, each of said liquid and gas chambers extending throughout a periphery of said annular elastic member and being effective for vibrations in all radial directions.

2. A vibration insulating device as claimed in claim 1, wherein said elastic member is formed with an annular groove located generally coaxial with said inner cylindrical member, said annular groove being open to an outer peripheral surface of the periphery of said elastic member providing an opening, said opening being closed with said outer cylindrical member, the outer peripheral surface of said elastic member being securely connected with said outer cylindrical member.

3. A vibration insulating device as claimed in claim 2, wherein said annular groove has a bottom surface located near an inner peripheral surface of the periphery of said elastic member to provide a diaphragm-like section of said elastic member, said annular elastic member being securely connected with the inner peripheral surface of said inner cylindrical member.

4. A vibration insulating device as claimed in claim 3, wherein said flexible diaphragm member is generally cylindrical, extends axially, extends around the periphery of said annular elastic member and includes a cylindical central section located within said annular groove to divide inside of the annular groove into the liquid chamber and the gas chamber.

5. A vibration insulating device as claimed in claim 4, wherein said flexible diaphragm member includes first and second end sections which are integrally connected by said central section, each of said first and second end sections being secured between said elastic member and said outer cylindrical member.

6. A vibration insulating device as claimed in claim 2, further comprising first and second rigid ring members which are securely connected to said elastic member and located on opposite sides of said annular groove, said first and second ring members being generally coaxial with and securely connected to said outer cylindrical member.

7. A vibration insulating device as claimed in claim 6, wherein each of first and second ring members has an inner peripheral surface in contact with the outer peripheral surface of said elastic member, and an outer peripheral surface in contact with the inner peripheral surface of said outer cylindrical member.

8. A vibration insulating device as claimed in claim 4, wherein said flexible diaphragm member central section has a generally C-shaped cross-section to form an annular space serving as the gas chamber between said cylindrical central section and said outer cylindrical member, the liquid chamber being located on opposite side of said central section from the gas chamber and being defined between surface of said central section and wall surface of said elastic member annular groove.

9. A vibration insulating device as claimed in claim 6, further comprising an intermediate cylindrical member securely disposed between said outer cylindrical member and each of said first and second ring members to cover the annular opening of said annular groove, said intermediate cylindrical member being formed with through-holes, wherein said flexible diaphragm member is secured between said intermediate cylindrical member and said outer cylindrical member, the gas chamber being formed between said flexible diaphragm member and said outer cylindrical member, a space being formed between flexible diaphragm member and said intermediate cylindrical member, said space being communicated with inside of said elastic member annular groove to be filled with said liquid.

10. A vibration insulating device as claimed in claim 9, wherein said intermediate cylindrical member and said outer cylindrical members are respectively formed with first and second annular grooves which are located on opposite sides of said flexible diaphragm member.

11. A vibration insulating device as claimed in claim 10, wherein said outer cylindrical member is formed with through-holes to establish gas communication said gas chamber and ambient air.

12. A vibration insulating device as claimed in claim 3, further comprising first and second intermediate cylindrical members disposed coaxial with said inner cylindrical member and securely interposed between said inner cylindrical member and said elastic member, said first and second intermediate cylindrical members being located spaced from each other to define an annular space therebetween and between said inner cylindrical member and the diaphragm-like section of said elastic member, said annular space servings as the gas chamber, said diaphragm-like section serving as said flexible diaphragm member.

13. A vibration insulating device as claimed in claim 2, wherein said annular flexible diaphragm member is an annular hollow hose-shaped diaphragm member disposed generally coaxial with and located within said annular groove, inside of said hose-shaped diaphragm member being filled with the gas and serving as the gas chamber, outside of said hose-shaped diaphragm member being filled with the liquid and serving as the liquid chamber.

14. A vibration insulating device as claimed in claim 4, further comprising an annular stop member disposed coaxial with said elastic member and projecting radially outwardly from bottom surface of said annular groove of said elastic member, said annular stop member being strikable through said flexible diaphragm member central section against said outer cylindrical member.

15. A vibration insulating device as claimed in claim 14, said annular stop member is integral with said elastic member and made of the same material as said elastic member.

16. A vibration insulating device as claimed in claim 1, wherein said elastic member is an elastic diaphragm member including oppositely disposed first and second annular side walls securely connected to said outer cylindrical member, and an annular bottom wall section integrally connecting said first and second side wall sections and secured to said inner cylindrical member, said hollow chamber being defined between inner wall surface of said elastic diaphragm member and inner peripheral surface of said outer cylindrical member.

17. A vibration insulating device as claimed in claim 16, further comprising first and second rigid ring members securely connected to inner peripheral surface of said outer cylindrical member and spaced from each other, each of said first and second rigid ring members being disposed coaxial with said outer cylindrical member, wherein each of said annular side walls of said elastic diaphragm member has an outer peripheral portion secured to one of said first and second rigid ring member, and an inner peripheral portion integral with said bottom wall section.

18. A vibration insulating device as claimed in claim 1, further comprising means for preventing an excessive radial displacement of said inner cylindrical member relative to said outer cylindrical member throughout the periphery of said vibration insulating device.

19. A vibration insulating device as claimed in claim 18, wherein said excessive radial displacement preventing means includes an annular stop member disposed in and generally coaxial with said annular hollow chamber, said annular stop member being made of an elastomeric material.

20. A vibration insulating device as claimed in claim 19, wherein said annular stop member is integral with said annular elastic member.

21. A vibration insulating device as claimed in claim 19, wherein said annular stop member is integral with said annular flexible diaphragm member.

22. A vibration insulating device according to claim 1, wherein said gas and liquid chambers extend continuously around the periphery of said annular elastic member.

23. A vibration insulating device comprising:
an inner cylindrical member;
an outer cylindrical member disposed around said inner cylindrical member;
an annular elastic member disposed between said inner and outer cylindrical members and securely connected to said inner and outer cylindrical members, respectively, said elastic member being generally coaxial with said inner cylindrical member;
means defining an annular hollow chamber between said inner and outer cylindrical members, said annular hollow chamber being generally coaxial with said outer cylindrical member;
an annular flexible diaphragm member at least a part of which is disposed within said hollow chamber to define, within said hollow chamber, a liquid chamber filled with a liquid and a gas chamber filled with a gas, said flexible diaphragm member being generally coaxial with said outer cylindrical member, each of said liquid and gas chambers extending throughout a periphery of said elastic member; and said annular elastic member having an annular groove formed therein which is located generally coaxial with said inner cylindrical member, said annular groove having a bottom surface located near an inner peripheral surface of said elastic member to provide a diaphragm-like section of said elastic member, said annular groove being open in an outside direction and having an annular opening at an outer peripheral surface of said annular elastic member, said annular opening being closed with said outer cylindrical member, the outer peripheral surface of said annular elastic member being securely connected with said outer cylindrical member, the inner peripheral surface of said annular elastic member being securely connected with said inner cylindrical member, said flexible diaphragm member being generally cylindrical, extending axially, and including a cylindrical central section located within said annular groove to divide inside of the annular groove into the liquid chamber and the gas chamber, said flexible diaphragm member central section having a generally C-shaped cross section to form an annular space serving as the gas chamber between said cylindrical central section and said outer cylindrical member, the liquid chamber being located on an opposite side of said central section from the gas chamber and being defined between a surface of said central section and a wall surface of said elastic member annular groove; and
an annular stop member disposed generally coaxial with and projecting radially outwardly from said flexible diaphragm member central section into the gas chamber, said annular stop member being contactable with said outer cylindrical member.

24. A vibration insulating device as claimed in claim 23, wherein said annular stop member is integral with said flexible diaphragm member and made of the same material as said flexible diaphragm member.

* * * * *